Aug. 12, 1941.　　　H. R. YOUNG ET AL　　　2,252,655
ROTATABLE TOOL HOLDER
Filed Oct. 13, 1939　　　4 Sheets-Sheet 1

Inventors
Harry R. Young
Roderick P. Stocking
by their Attorneys
Howson & Howson Aug. 12, 1941.   H. R. YOUNG ET AL   2,252,655
ROTATABLE TOOL HOLDER
Filed Oct. 13, 1939   4 Sheets-Sheet 4
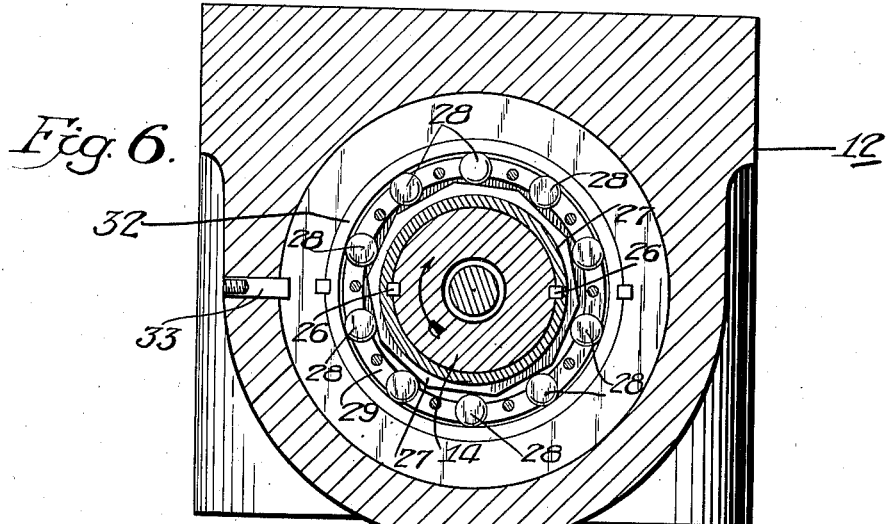
Fig. 6.
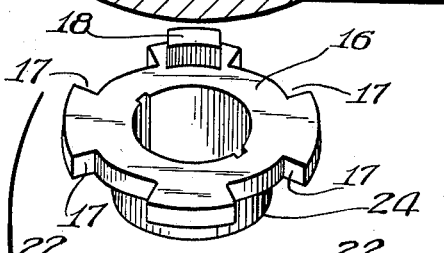
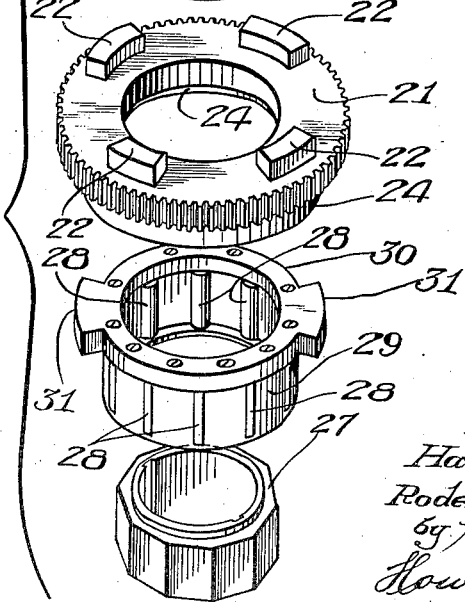
Fig. 7.
Inventors:—
Harry R. Young
Roderick P. Stocking
by their Attorneys
Howson & Howson Patented Aug. 12, 1941

2,252,655

UNITED STATES PATENT OFFICE 2,252,655

ROTATABLE TOOL HOLDER

Harry Russell Young, Lower Merion, and Roderick P. Stocking, Drexel Hill, Pa., assignors to William Sellers & Company, Incorporated, Philadelphia, Pa., a corporation of Pennsylvania Application October 13, 1939, Serial No. 299,359

8 Claims. (Cl. 90—52)

This invention relates to tool holders for planers and, more particularly to a tool holder for use in planers in which a two-way cutting operation is to be performed.

In the ordinary planer, the cutting operation is only in one direction and movement of the planer table in the opposite direction wastes considerable time. Furthermore, there arises a necessity for so mounting the tool that it may be elevated out of engagement with or drag harmlessly across the work. Such mountings are, obviously, disadvantageous particularly in situations where the work must be deeply slotted as, for example, in planing slots in the rotary cores of electric motors or generators or for like operations.

An important object of the present invention is the provision of a rotating tool holder by means of which the tool may be accurately rotated through 180° at each operation, thus enabling the tool to cut in opposite directions.

Another object of the invention is the provision in a device of this character of a novel and improved means for clamping the tool in its newly assumed positions so that accurate alignment thereof with the work during each operation may be secured and a smoothly cut wall may be formed.

A further object of the invention is the provision of a structure of this character which may be readily and cheaply manufactured, which will be durable and efficient in service and a general improvement in the art.

These and other objects we attain by the construction shown in the accompanying drawings wherein, for the purpose of illustration, we have shown a preferred embodiment of our invention and wherein:

Fig. 6 is a section on line 6—6 of Fig. 3;

Fig. 7 is a combined perspective showing the elements of the tool control mechanism.

Figure 1:
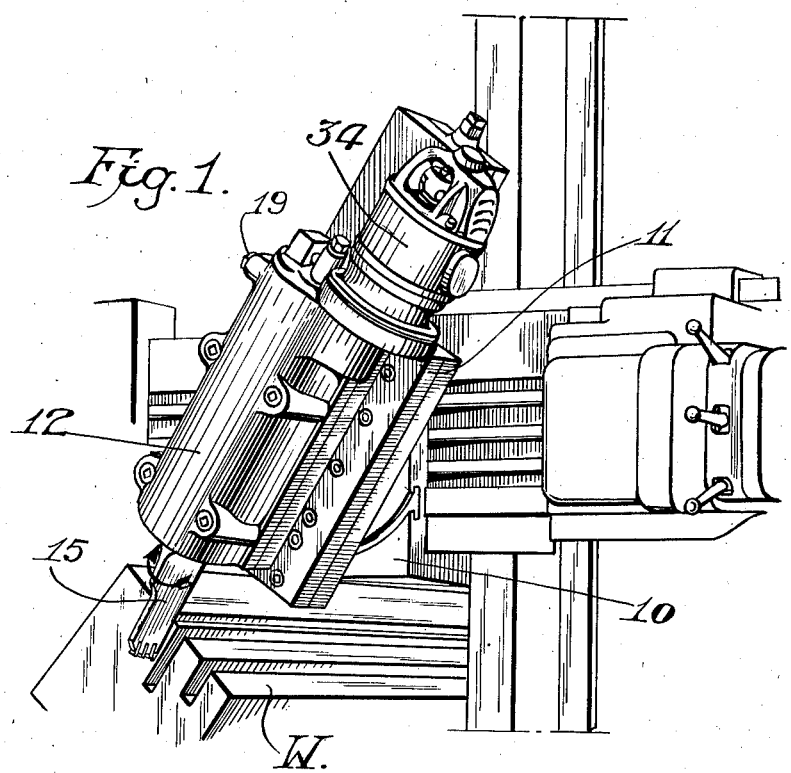
Fig. 1 is a fragmentary perspective view of a planer embodying a tool holder constructed in accordance with our invention.

Referring now more particularly to the drawings, the numeral 10 generally designates the saddle of a planer and 11 the saddle slide having mounted thereon a housing 12 enclosing the mechanism about to be described. Within the housing 12 in bearings 13 we mount a tool holder 14 in which the tool 15 is secured in any suitable manner.

Keyed to the tool holder adjacent the upper end thereof is a disc 16, the periphery of which is notched as indicated at 17 and the upper surface of which is provided with an upstanding lug 18 adapted to coact with a pair of adjustable stop screws 19 mounted in the housing and in the plane of rotation of the lug. This lug is, preferably, and as more particularly shown in Figure 4, provided with hardened stop members 20 disposed at opposite faces thereof and adapted to engage with the stop screws, the purpose of which stop screws is that of checking rotation of the disc and, accordingly, of the tool holder when the tool holder has made a rotation of exactly 180°.

Figure 4:
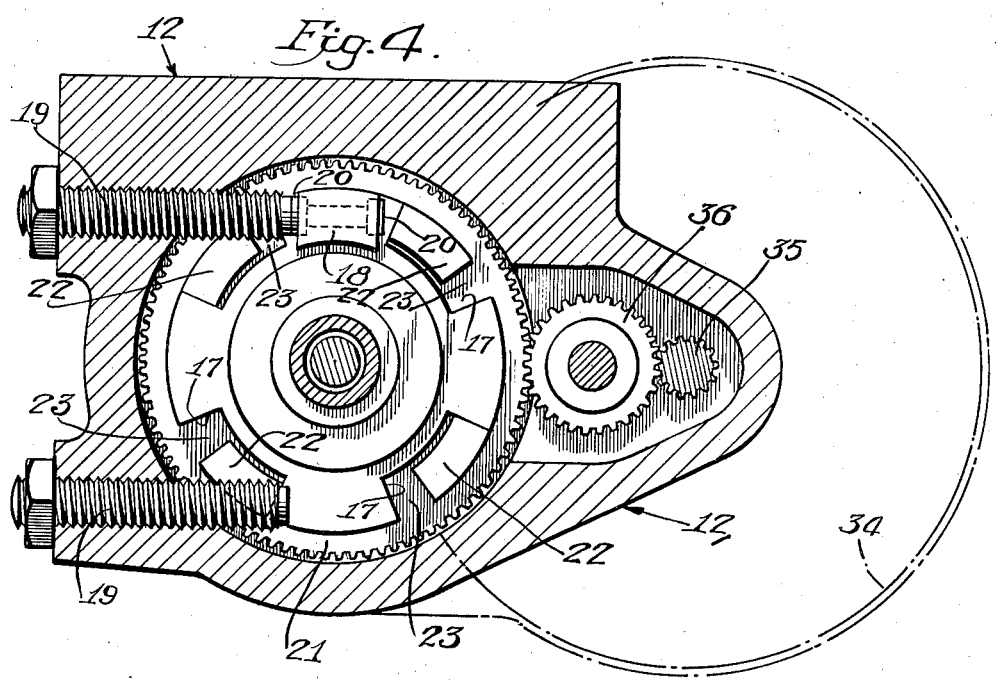
Fig. 4 is a section on line 4—4 of Fig. 3.
Figures 5, 8:
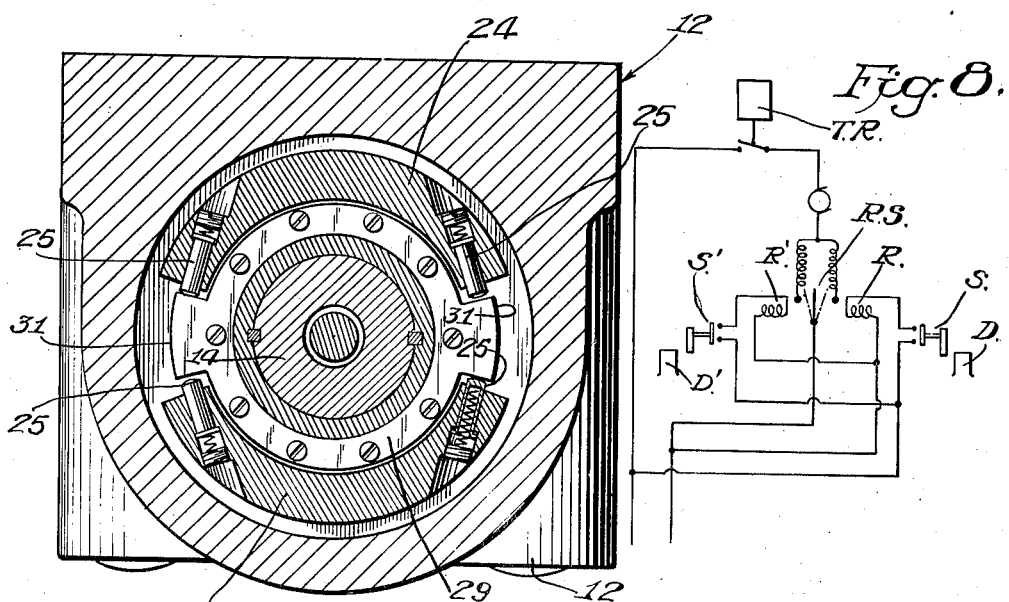
Fig. 5 is a section on line 5—5 of Fig. 3.
Fig. 8 is an illustrative diagram of a control circuit for the operating motor associated with the tool.

Surrounding the tool holder 14 and rotatable with relation thereto is a gear 21 the upper surface of which is provided with upstanding lugs 22 which engage in the notches 17 of disc 16 and have a slight play in their engagement therein, as more clearly shown in Figure 4 at 23. The lower end of this gear has a pair of depending lugs 24, the end faces of which have projecting therethrough cushioned plungers 25. Keyed to the tool holder at 26 (Fig. 6) is a cam element 27 the cam faces of which are in the form of a regular polygon and coact with rollers 28. Rollers 28 are carried by a cage 29 the upper end of which is secured to a ring 30 having a pair of projecting lugs 31 which engage between the depending lugs 24 of the hub of gear 21. The outer surfaces of these rollers operate against a ring 32 fixed to the housing 12 as by key 33. Gear 21 is driven by a torque motor 34 the shaft of which is indicated at 35 and is connected to the gear 21 through pinion 36.

Figure 2:
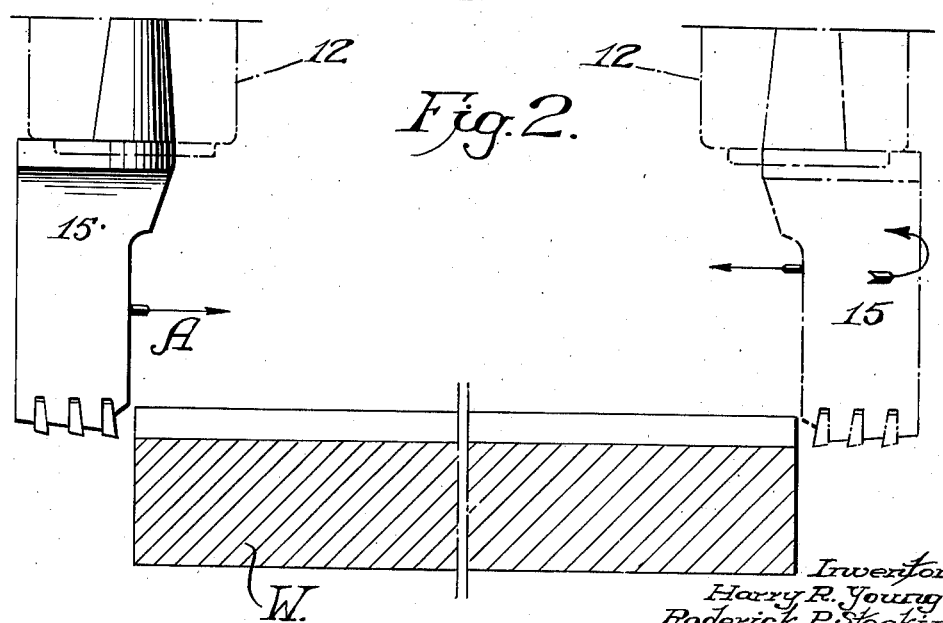
Fig. 2 is a semi-diagrammatic view illustrating the operation of the tool with relation to the work.
Figure 3:
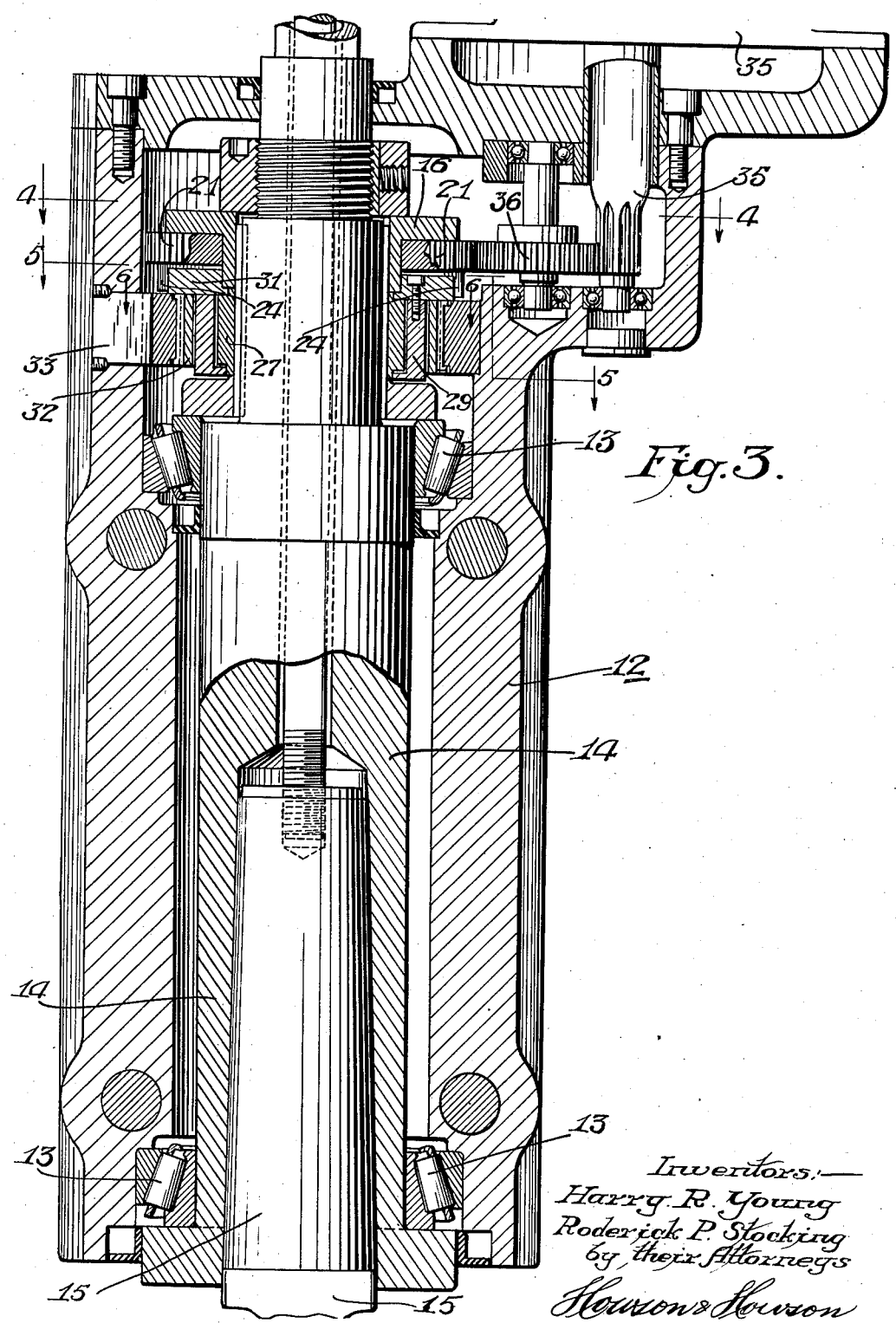
Fig. 3 is a vertical longitudinal sectional view through a tool holder constructed in accordance with our invention.

The operation of the apparatus is as follows: Assuming the tool to be disposed at one end of the work W and to be faced properly for a cutting stroke in the direction of the arrow A (Fig. 2), upon completion of the working stroke a dog D on the planer table (not herein shown) operates a switch S and through a relay R a reversing switch RS controlling the direction of operation of the motor. The initial operation of the motor rotates gear 21 and through lugs 24 shifts cage 29 breaking the locking engagement between rollers 28, stationary ring 32 and cam 27, thus freeing the cam and the tool holder for rotation in a clockwise direction and moving the rollers 28 to a position where they will lock cam 27 and the tool holder against anti-clockwise rotation with relation to ring 32. The tool holder is then rotated until stop 18 engages the other of the screws 19 from that with which it had been previously engaged, following which the rollers are again driven into locking engagement between the cam and stationary ring by the springs of the then active plungers 25. It will be noted that during rotation of the tool holder one pair of the plungers 25 will serve as a means to urge the rollers toward the new locking position until lug 18 engages the other of stops 19. With checking of rotation of the tool holder the rollers are jammed against the cam surfaces by the spring-pressed plungers 25 locking the tool holder against return rotation. At the completion of the next working stroke of the tool, these operations are reversed through a corresponding stop, switch, and relay indicated respectively at D', S' and R'. If desired, the passage of current through the torque motor 34 may be terminated upon completion of the shifting operation by means of a thermal relay, or like device delaying opening of the circuit, indicated generally at TR.

Since the construction illustrated is, obviously, capable of considerable modification without departing from the spirit of the invention, we do not wish to be understood as limiting ourselves thereto except as hereinafter claimed.

We claim:

1. A tool mounting for planers and the like comprising a casing, a tool holder mounted for rotation in said casing, a rotatable member, yieldable means to reversely rotate said member, an element secured to the tool holder, means to positively limit rotation of said element to a predetermined arc, means to lock said tool holder to said casing including a part movable with relation to both the casing and tool holder through predetermined limits, said means to rotate the tool holder initially disengaging said lock and subsequently re-engaging the same.

2. A tool mounting for planers and the like comprising a casing, a tool holder mounted for rotation in said casing, a rotatable member, yieldable means to reversely rotate said member, an element secured to the tool holder, means to positively limit rotation of said element to a predetermined arc, means to lock said tool holder to said casing including a part movable with relation to both the casing and tool holder through predetermined limits, said means to rotate the tool holder initially disengaging said lock and yieldably urging the same to locking position, the rotation of the tool holder maintaining said lock is disengaged position until movement of the tool holder is checked by said limit means.

3. In combination, a reversely rotatable tool holder, means to reversely rotate said tool holder, means to limit rotation of said tool holder, and means to lock said tool holder at either limit of its rotation, rotation of said tool holder rendering said locking means inoperative during continued rotation of the tool holder from one to the other of said limits, said locking means comprising a part rotatable with the tool holder, and means yielding during continued rotation of the tool holder between one and the other of said limits to permit movement of said locking means to non-locking position.

4. In combination, a reversely rotatable tool holder, means to reversely rotate said tool holder, means to limit rotation of said tool holder, means to lock said tool holder at either limit of its rotation, said locking means having a non-locking position, operative connections between said rotating means and said locking means whereby primary operation of said rotating means to rotate the tool holder in either direction shifts said locking means to non-locking position, and yieldable means holding said locking means in non-locking position during continued rotation of the tool holder between said limits.

5. In combination, a reversely rotatable tool holder, means to reversely rotate said tool holder, means to limit rotation of said tool holder, means to lock said tool holder at either limit of its rotation, said locking means having a non-locking position, operative connections between said rotating means and said locking means whereby primary operation of said rotating means to rotate the tool holder in either direction shifts said locking means to non-locking position, and yieldable means carried by said rotating means holding said locking means in non-locking position during continued rotation of the tool holder between said limits.

6. In combination, a reversely rotatable tool holder, means to reversely rotate said tool holder, means to limit rotation of said tool holder, a roller clutch to lock said tool holder at either limit of its rotation, said clutch comprising a locking part having an intermediate non-locking position, operative connections between said rotating means and said locking part whereby primary operation of said rotating means to rotate the tool holder in either direction shifts said locking part to non-locking position, and yieldable means holding said locking part in non-locking position during continued rotation of the tool holder between said limits.

7. In combination, a reversely rotatable tool holder, means to reversely rotate said tool holder, means to limit rotation of said tool holder, a roller clutch to lock said tool holder at either limit of its rotation, said clutch comprising a locking part having an intermediate non-locking position, operative connections between said rotating means and said locking part whereby primary operation of said rotating means to rotate the tool holder in either direction shifts said locking part to non-locking position, and yieldable means carried by said rotating means holding said locking part in non-locking position during continued rotation of the tool holder between said limits.

8. In combination, a reversely rotatable tool holder, means to reversely rotate said tool holder, means to limit rotation of said tool holder, and means to lock said tool holder at either limit of its rotation, rotation of said tool holder rendering said locking means inoperative during continued rotation of the tool holder from one to the other of said limits, said locking means comprising a part rotatable with the tool holder, and means yielding during continued rotation of the tool holder between one and the other of said limits to permit movement of said locking means to non-locking position, said locking means comprising a locking part rotating with said rotating means and capable of limited rotation with relation to the tool holder.

HARRY R. YOUNG.
RODERICK P. STOCKING.